(12) United States Patent
Chen et al.

(10) Patent No.: US 11,285,765 B2
(45) Date of Patent: Mar. 29, 2022

(54) METHOD FOR AUTO-LOCATING POSITIONS OF A PLURALITY OF WIRELESS SENSORS ON A VEHICLE AND AN APPARATUS THEREFOR

(71) Applicant: Bendix Commercial Vehicle Systems LLC, Elyria, OH (US)

(72) Inventors: Qing Chen, Coquitlam (CA); Kian Sheikh-Bahaie, Port Moody (CA); Robert G Patterson, Burnaby (CA); Shawn D Lammers, Delta (CA)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 365 days.

(21) Appl. No.: 16/707,452

(22) Filed: Dec. 9, 2019

(65) Prior Publication Data

US 2021/0170812 A1 Jun. 10, 2021

(51) Int. Cl.
*B60C 23/04* (2006.01)
*B60C 23/00* (2006.01)
(Continued)

(52) U.S. Cl.
CPC ...... *B60C 23/0416* (2013.01); *B60C 23/0486* (2013.01); *B60T 17/22* (2013.01); *G07C 5/08* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 7,506,540 B1 3/2009 Job
9,139,054 B2 9/2015 Lammers
(Continued)

FOREIGN PATENT DOCUMENTS

CN 106457936 * 2/2017
CN 109532354 * 3/2019
(Continued)

OTHER PUBLICATIONS

Bendix Commercial Vehicle Systems LLC, "SmarTire Tire Pressure Monitoring System Operator's Manual," Manual, Apr. 2015, 80 pages, Bendix Commercial Vehicle Systems, Elyria Ohio U.S.A.

*Primary Examiner* — Andre J Allen
(74) *Attorney, Agent, or Firm* — Cheryl Greenly; Brian Kondas; Eugene Clair

(57) ABSTRACT

An apparatus is provided for auto-locating positions of a plurality of wireless sensors on a vehicle. The apparatus comprises a receiving unit for receiving signals from the plurality of wireless sensors. The apparatus further comprises a processing unit arranged to calculate a probability value for each one of the plurality of wireless sensors based upon signals that have accumulated over a period of time to provide a table of probability values. Each probability value contained in the table during a calculation cycle of the processing unit is indicative of likelihood of one of the plurality of wireless sensors being located at a corresponding one of a plurality of positions on the vehicle. Each one of the plurality of wireless sensors is associated with the position having the highest probability value during the calculation cycle.

20 Claims, 9 Drawing Sheets

(51) Int. Cl.
B60T 17/22 (2006.01)
G07C 5/08 (2006.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 9/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .............................................. 73/146–146.8
See application file for complete search history.

(56) References Cited

U.S. PATENT DOCUMENTS

| | | | |
|---|---|---|---|
| 9,415,643 B2 | 8/2016 | Lammers | |
| 9,851,227 B2 | 12/2017 | Lammers | |
| 2015/0057876 A1* | 2/2015 | Graham | B60C 23/0416 701/33.4 |
| 2015/0057878 A1* | 2/2015 | Friel | B60C 23/00 701/34.4 |

(56) References Cited

U.S. PATENT DOCUMENTS

| | | | | |
|---|---|---|---|---|
| 2016/0258830 A1* | 9/2016 | Lammers | .............. | B60C 23/044 |
| 2018/0111430 A1* | 4/2018 | Muddiman | ......... | B60C 23/0416 |
| 2021/0078371 A1* | 3/2021 | Dickson | .............. | B60C 23/0422 |

FOREIGN PATENT DOCUMENTS

| | | | | | |
|---|---|---|---|---|---|
| EP | 3470246 | A1 * | 4/2019 | ....... | B60C 23/04985 |
| KR | 863102 | B1 * | 10/2008 | | |
| KR | 20160046830 | | * | 4/2016 | |
| WO | WO-2008156446 | A1 * | 12/2008 | ........... | B60C 23/009 |
| WO | WO-2016035794 | A1 * | 3/2016 | ............. | B60C 23/04 |

\* cited by examiner

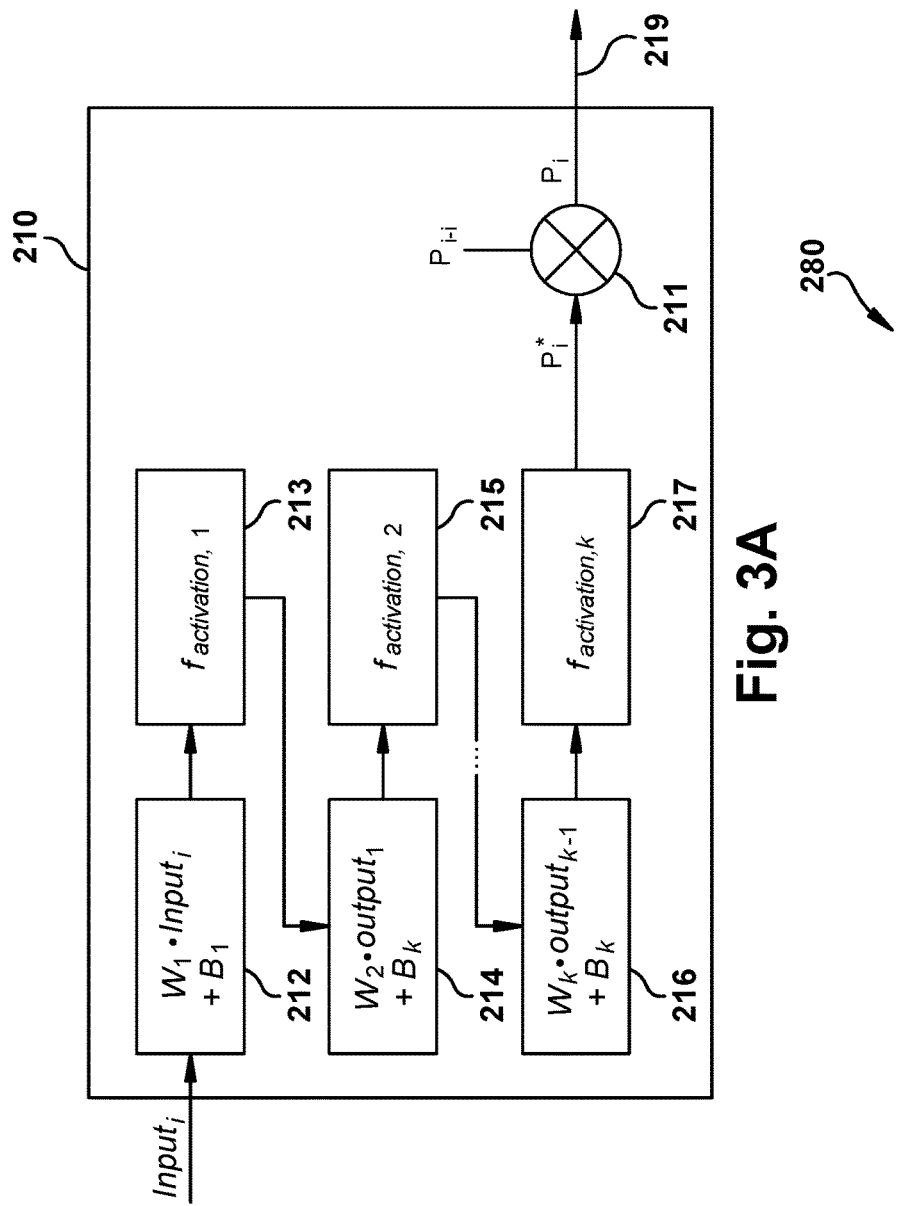

| $P^i_{k,n}$ | Probability on position 1 | Probability on position 2 | Probability on position 3 | Probability on position 4 | Probability on position 5 |
|---|---|---|---|---|---|
| Sensor 1 | $P^i_{1,1}$ | $P^i_{1,2}$ | $P^i_{1,3}$ | $P^i_{1,4}$ | $P^i_{1,5}$ |
| Sensor 2 | $P^i_{2,1}$ | $P^i_{2,2}$ | $P^i_{2,3}$ | $P^i_{2,4}$ | $P^i_{2,5}$ |
| Sensor 3 | $P^i_{3,1}$ | $P^i_{3,2}$ | $P^i_{3,3}$ | $P^i_{3,4}$ | $P^i_{3,5}$ |
| Sensor 4 | $P^i_{4,1}$ | $P^i_{4,2}$ | $P^i_{4,3}$ | $P^i_{4,4}$ | $P^i_{4,5}$ |
| Sensor 5 | $P^i_{5,1}$ | $P^i_{5,2}$ | $P^i_{5,3}$ | $P^i_{5,4}$ | $P^i_{5,5}$ |

Fig. 3C

$$P_{k,n} = P^{output}_{k,n} \times P^{i-1}_{k,n} \quad \{n \in (1,m);\ k \in (1,p)\}$$

$$P^i_{k,n} = \frac{P_{k,n}}{\sum_{j=1}^{m} P_{k,j}} \quad \{n \in (1,m);\ k \in (1,p)\}$$

where $P^{output}_{k,n}$ is the probability of sensor k on position n outputted by prediction model;

$P^{i-1}_{k,n}$ is the processed probability of sensor k on position n using data batch i-1;

$P^i_{k,n}$ is the processed probability of sensor k on position n using data batch i;

m is the number of model outputs, which will be 5 in our case; and p is the number of sensors, which is equal to m.

Table 550:
| | $P_{Posi\,1}$ | ... | $P_{Posi\,l}$ | ... | $P_{Posi\,5}$ |
|---|---|---|---|---|---|
| $Sensor_1$ | x | ... | x | ... | x |
| ... | ... | ... | ... | ... | ... |
| $Sensor_n$ | x | ... | x | ... | x |
| ... | ... | ... | ... | ... | ... |
| $Sensor_m$ | x | ... | x | ... | x |
| ... | ... | ... | ... | ... | ... |
| $Sensor_5$ | x | ... | x | ... | x |

Table 552:
| | $P_{Posi\,1}$ | ... | $P_{Posi\,l}$ | ... | $P_{Posi\,5}$ |
|---|---|---|---|---|---|
| $Sensor_1$ | x | ... | 0 | ... | x |
| ... | ... | ... | ... | ... | ... |
| $Sensor_n$ | x | ... | x | ... | x |
| ... | ... | ... | ... | ... | ... |
| $Sensor_m$ | x | ... | x | ... | x |
| ... | ... | ... | ... | ... | ... |
| $Sensor_5$ | x | ... | 0 | ... | x |

Table 560:
| | $P_{Posi\,1}$ | ... | $P_{Posi\,z}$ | ... | $P_{Posi\,5}$ |
|---|---|---|---|---|---|
| $Sensor_1$ | x | ... | x | ... | x |
| ... | ... | ... | ... | ... | ... |
| $Sensor_k$ | x | ... | x | ... | x |
| ... | ... | ... | ... | ... | ... |
| $Sensor_m$ | x | ... | x | ... | x |
| ... | ... | ... | ... | ... | ... |
| $Sensor_5$ | x | ... | x | ... | x |

Table 562:
| | $P_{Posi\,1}$ | ... | $P_{Posi\,z}$ | ... | $P_{Posi\,5}$ |
|---|---|---|---|---|---|
| $Sensor_1$ | x | ... | 0 | ... | x |
| ... | ... | ... | ... | ... | ... |
| $Sensor_k$ | 0 | ... | 1 | ... | 0 |
| ... | ... | ... | ... | ... | ... |
| $Sensor_m$ | x | ... | 0 | ... | x |
| ... | ... | ... | ... | ... | ... |
| $Sensor_5$ | x | ... | 0 | ... | x |

570

| | | Probability Table | | | | |
|---|---|---|---|---|---|---|
| | | Position 1 | Position 1 | Position 3 | Position 4 | Position 5 |
| 571 — Original table | Sensor 1 | 0.91106 | 0.00000 | 0.00000 | 0.00000 | 0.08894 |
| | Sensor 2 | 0.00000 | 0.97638 | 0.02034 | 0.00328 | 0.00000 |
| | Sensor 3 | 0.00000 | 0.00722 | 0.71561 | 0.27715 | 0.00002 |
| | Sensor 4 | 0.00000 | 0.00002 | 0.54749 | 0.44784 | 0.00465 |
| | Sensor 5 | 0.36615 | 0.00000 | 0.00006 | 0.00031 | 0.63348 |
| 572 — Adjusted after locate 2 at position 2 | Sensor 1 | 0.91106 | 0.00000 | 0.00000 | 0.00000 | 0.08894 |
| | Sensor 2 | 0.00000 | 1.00000 | 0.00000 | 0.00000 | 0.00000 |
| | Sensor 3 | 0.00000 | 0.00000 | 0.72081 | 0.27916 | 0.00002 |
| | Sensor 4 | 0.00000 | 0.00000 | 0.54750 | 0.44785 | 0.00465 |
| | Sensor 5 | 0.36615 | 0.00000 | 0.00006 | 0.00031 | 0.63348 |
| 573 — Adjusted after locate 1 at position 1 | Sensor 1 | 1.00000 | 0.00000 | 0.00000 | 0.00000 | 0.00000 |
| | Sensor 2 | 0.00000 | 1.00000 | 0.00000 | 0.00000 | 0.00000 |
| | Sensor 3 | 0.00000 | 0.00000 | 0.72081 | 0.27916 | 0.00002 |
| | Sensor 4 | 0.00000 | 0.00000 | 054750 | 0.44785 | 0.00465 |
| | Sensor 5 | 0.00000 | 0.00000 | 0.00009 | 0.00049 | 0.99941 |
| 574 — Adjusted after locate 5 at position 5 | Sensor 1 | 1.00000 | 0.00000 | 0.00000 | 0.00000 | 0.00000 |
| | Sensor 2 | 0.00000 | 1.00000 | 0.00000 | 0.00000 | 0.00000 |
| | Sensor 3 | 0.00000 | 0.00000 | 0.72083 | 0.27917 | 0.00000 |
| | Sensor 4 | 0.00000 | 0.00000 | 0.55006 | 0.44994 | 0.00000 |
| | Sensor 5 | 0.00000 | 0.00000 | 0.00000 | 0.00000 | 1.00000 |
| 575 — Adjusted after locate 3 at position 3 | Sensor 1 | 1.00000 | 0.00000 | 0.00000 | 0.00000 | 0.00000 |
| | Sensor 2 | 0.00000 | 1.00000 | 0.00000 | 0.00000 | 0.00000 |
| | Sensor 3 | 0.00000 | 0.00000 | 1.00000 | 0.00000 | 0.00000 |
| | Sensor 4 | 0.00000 | 0.00000 | 0.00000 | 1.00000 | 0.00000 |
| | Sensor 5 | 0.00000 | 0.00000 | 0.00000 | 0.00000 | 1.00000 |
| 576 — After all sensors are allocated | Sensor 1 | 1.00000 | 0.00000 | 0.00000 | 0.00000 | 0.00000 |
| | Sensor 2 | 0.00000 | 1.00000 | 0.00000 | 0.00000 | 0.00000 |
| | Sensor 3 | 0.00000 | 0.00000 | 1.00000 | 0.00000 | 0.00000 |
| | Sensor 4 | 0.00000 | 0.00000 | 0.00000 | 1.00000 | 0.00000 |
| | Sensor 5 | 0.00000 | 0.00000 | 0.00000 | 0.00000 | 1.00000 |

Fig. 5E

METHOD FOR AUTO-LOCATING POSITIONS OF A PLURALITY OF WIRELESS SENSORS ON A VEHICLE AND AN APPARATUS THEREFOR

BACKGROUND

The present application relates to vehicle wireless sensors, and is particularly directed to a method for auto-locating positions of a plurality of wireless sensors on a vehicle and an apparatus therefor.

An example of a vehicle wireless sensor is a tire pressure sensor of a tire sensor system. Tire sensor systems for a vehicle, for example tire pressure monitoring systems, typically include at least one tire pressure sensor in each one of a plurality of tires. The tire pressure sensors communicate tire condition information wirelessly with a central controller on the vehicle. The wheel from which the tire pressure sensor signal is originating must be identified to indicate properly to the driver or technician which tire is in need of service. One method commonly used to associate a tire pressure sensor with the wheel location in which it is installed is by manually updating the central controller with a tire pressure sensor's unique identification code (ID) when the tire with the tire pressure sensor is installed on the vehicle. This method requires time and effort from a trained technician who has the means to activate the tire pressure sensor to obtain the unique ID and then communicate with the central controller.

Trucks and/or tractors typically have at least six tires in which tire pressure sensors are installed. The tires are installed on the truck as one of the last items during an assembly line operation at an original equipment manufacturer. It is a time consuming activity to manually activate each tire pressure sensor to obtain the unique ID and then access the central controller to associate the unique ID with the wheel location in which the tire pressure sensor is installed. Often there is limited time available to add another step to the process. Likewise, whenever a tire is replaced, the central controller needs to be manually updated to associate the new tire pressure sensor unique ID with the proper wheel location. Accordingly, those skilled in the art continue with research and development efforts in the field of configuring tire sensor systems when wheels are rotated or tires and their associated tires sensors are installed or replaced.

SUMMARY

In accordance with one aspect, an apparatus is provided for auto-locating positions of a plurality of wireless sensors on a vehicle. The apparatus comprises a receiving unit for receiving signals from the plurality of wireless sensors. The apparatus further comprises a processing unit arranged to calculate a probability value for each one of the plurality of wireless sensors based upon signals that have accumulated over a period of time to provide a table of probability values. Each probability value contained in the table during a calculation cycle of the processing unit is indicative of likelihood of one of the plurality of wireless sensors being located at a corresponding one of a plurality of positions on the vehicle. Each one of the plurality of wireless sensors is associated with the position having the highest probability value during the calculation cycle.

In accordance with another aspect, an apparatus is provided for auto-locating positions of a plurality of tire sensors on a vehicle. The apparatus comprises a receiving unit for receiving signals from the plurality of tire sensors. The apparatus further comprises a processing unit arranged to calculate a probability value for each one of the plurality of tire sensors based upon signals that have accumulated over a period of time to provide a table of probability values. Each probability value contained in the table during a calculation cycle of the processing unit is indicative of likelihood of one of the plurality of tire sensors being located at a corresponding one of a plurality of positions on the vehicle. Each one of the plurality of tire sensors is associated with the position having the highest probability value during the calculation cycle.

In accordance with another aspect, an apparatus is provided for auto-locating positions of a plurality of tire sensors on a vehicle. The apparatus comprises means for collecting tire sensor data from each one of the plurality of tire sensors. The apparatus further comprises means for predicting position of each one of the plurality of tire sensors based upon probability values that are calculated based upon the collected tire sensor data.

In accordance with yet another aspect, a tire sensor monitoring system controller is provided for auto-locating positions of a plurality of tire sensors on a vehicle. The controller comprises an input port for receiving a plurality of tire sensor signals. The controller further comprises a processing unit for applying a position predicting algorithm to the tire sensor signals to predict positions of the plurality of tire sensors on the vehicle. The processing unit provides an output table of probability values each probability value being indicative of probability of a tire sensor being located at a specific position while the vehicle is in a driving state. The controller also comprises an output port for communicating the predicted positions to other vehicle controllers.

In accordance with still another aspect, a method is provided for a vehicle having a tire sensor system. The method comprises collecting tire sensor data associated with each one of a plurality of tire sensors while the vehicle is in a driving state. The method further comprises iteratively-calculating probability values for each one of the plurality of tire sensors while the vehicle is in a driving state based upon collected tire sensor data associated with the tire sensors to provide predicted positions using an output table of probability values in which each probability value corresponds to probability of a tire sensor being located at a specific position on the vehicle.

BRIEF DESCRIPTION OF THE DRAWINGS

FIG. 3A is a block diagram of a probability-table generating algorithm used in the auto-locating algorithm of FIG. 2.

FIG. 3B is a description of an example neural network that is used to implement the probability-table generating algorithm of FIG. 3A.

FIG. 3C is an example probability table that is generated using the probability-table generating algorithm of FIG. 3A and the neural network of FIG. 3B.

FIG. 4 is a description of an example set of equations that are used in the probability-table generating algorithm of FIG. 3A.

FIG. 5C is an example representation of setting a mask flag in the method of FIGS. 5A and 5B.

FIG. 5D is an example representation of setting a used flag in the method of FIGS. 5A and 5B.

FIG. 5E is an example series of output probability tables produced according to the method of FIGS. 5A and 5B.

DETAILED DESCRIPTION

Figure 1:
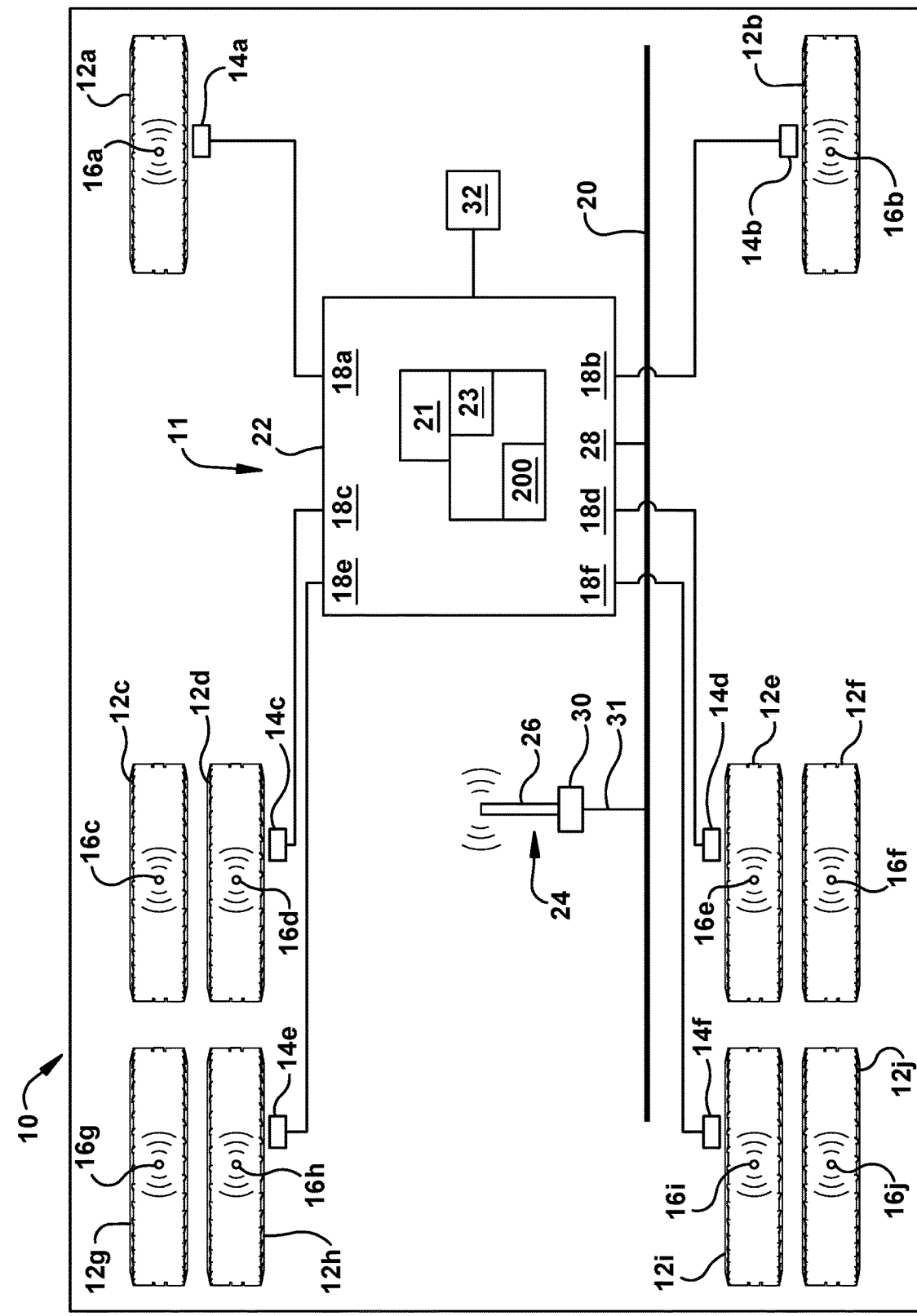
FIG. 1 is a schematic representation of a vehicle having a tire sensor system according to an embodiment.

Referring to FIG. 1, a schematic representation of a vehicle 10 having a tire sensor system 11 according to an embodiment is illustrated. The vehicle 10, a tractor or a truck, generally has at least six wheel locations and at least six tires. The wheel locations include right front, right mid, right rear, left front, left mid and left rear. The right mid, right rear, left mid and left rear wheel locations include an inner and an outer wheel location if dual tires are placed at these locations. A sample tire placement is illustrated in FIG. 1 with tire 12a at the left front, tire 12b at the right front, tire 12c at the outer left mid, tire 12d at the inner left mid, tire 12e at the inner right mid, tire 12f at the outer right mid, tire 12g at the outer left rear, tire 12h at the inner left rear, tire 12i at the inner right rear, and tire 12j at the outer right rear. Additional or fewer tires are contemplated.

Each tire in the tire sensor system 11 includes a tire sensor, illustrated by tire sensors 16a, 16b, 16c, 16d, 16e, 16f, 16g, 16h, 16i, 16j. The tire sensor 16a, 16b, 16c, 16d, 16e, 16f, 16g, 16h, 16i, 16j can be mounted inside the respective tires 12a, 12b, 12c, 12d, 12e, 12f, 12g, 12h, 12i, 12j on the rim or outside the tires on a valve stem. Each tire is a member of one or more tire groups. For example, tires 12a and 12b are in a steer group of vehicle tires, tires 12a, 12d, 12f, 12h, and 12j are in a counter-clockwise rotating group of vehicle tires, and tires 12b, 12c, 12e, 12g, and 12i are in a clockwise rotating group of vehicle tires. Other tire groups (i.e. inner/outer group) are possible.

The tire sensors 16a, 16b, 16c, 16d, 16e, 16f, 16g, 16h, 16i, 16j monitor tire characteristic information, such as tire pressure, tire temperature, sensor battery voltage, vehicle load and tire vibration. The tire sensors 16a, 16b, 16c, 16d, 16e, 16f, 16g, 16h, 16i, 16j can include an accelerometer or centrifugal switch to indicate a motion value, such as rotation of the wheel. The tire sensors 16a, 16b, 16c, 16d, 16e, 16f, 16g, 16h, 16i, 16j can be tire sensors, for example, used in the Smartire® Tire Pressure Monitoring System from Bendix Commercial Vehicle Systems LLC, of Elyria, Ohio.

Each tire sensor 16a, 16b, 16c, 16d, 16e, 16f, 16g, 16h, 16i, 16j comprises a wireless transmitter that periodically transmits signals containing the tire and sensor related information and a unique sensor identification code (ID) in a selected data transmission format. The transmitted signals include received signal strength indication (RSSI) data, which is a measurement of the power in a received radio signal. The format of the signal can be a standard or a proprietary radio frequency (RF) protocol. The tire sensors 16a, 16b, 16c, 16d, 16e, 16f, 16g, 16h, 16i, 16j can also be configured to transmit data transmission upon rotation of the tire or when there is a tire pressure alert event. In one embodiment, the tire sensor transmits a data transmission every three seconds when the acceleration value changes.

The tire sensor system 11 includes a wireless receiver 24. The wireless receiver 24 includes an antenna 26, a processing unit 30 and a communication port 31. The wireless receiver 24 receives the data transmissions in the selected data format containing the unique sensor ID from the tire sensors 16a, 16b, 16c, 16d, 16e, 16f, 16g, 16h, 16i, 16j wirelessly. The signals also include a motion value and a tire pressure value. The wireless receiver 24 decodes the tire characteristic information from the selected data transmission format to a tire characteristic message capable of being communicated on a serial communication bus 20. The format of the tire characteristic message may be a standard protocol, such as SAE J1939, or a proprietary protocol. The wireless receiver 24 is capable of communicating at least one tire characteristic message over the serial communication bus 20 via the communication port 31. The tire characteristic message can include, but is not limited to, information such as the instantaneous tire pressure, the comparison of the tire pressure against a tire pressure limit, instantaneous tire temperature, the comparison of the tire temperature against a tire temperature limit, motion value, and the unique sensor ID, for example. Other tire characteristic information is possible.

The vehicle 10 includes a wheel speed sensor 14a, 14b, 14c, 14d, 14e, 14f at each wheel location. Each wheel speed sensor 14a, 14b, 14c, 14d, 14e, 14f monitors the wheel speed at the wheel location. There can be fewer wheel speed sensors or a wheel speed sensor for each tire when more than one tire is located at a wheel location, such as with dual tire installations.

The tire sensor system 11 includes a controller 22. The controller 22 can be a stand-alone controller or a dedicated controller. The controller 22 includes a communication port 28 for communicating with the serial communication bus 20 on the vehicle 10. Controller 22 may communicate with other controllers on the vehicle 10 using the serial communication bus 20. The messages received and transmitted on the bus can be in a standardized serial communication bus format, such as SAE J1939, or in a proprietary format.

The wheel speed sensors 14a, 14b, 14c, 14d, 14e, 14f communicate wheel speed to the controller 22 via a hardwired connection through individual wheel speed ports 18a, 18b, 18c, 18d, 18e, 18f on the controller 22. It is conceivable that one or more of the wheel speed sensors 14a, 14b, 14c, 14d, 14e, 14f comprise wireless sensors, in which case no hardwire connection would be required. For simplicity and purpose of explanation, the wheel speed sensors 14a, 14b, 14c, 14d, 14e, 14f will be described herein using hardwired connections.

As shown in FIG. 1, wheel speed port 18a is associated with the wheel speed sensor 14a, which is located at the left front wheel location. Similarly wheel speed port 18b is associated with wheel speed sensor 14b, which is located at the left front wheel location, etc. The wiring for vehicle 10 is configured so that the wheel speed sensor 14a located at the left front wheel end section is connected to wheel speed port 18a on the controller 22. Alternatively, or in addition to, the wheel speed information is received via another means, such as over the serial communication bus 20 or via a wireless receiver.

The controller 22 includes a processing unit 21. The processing unit 21 includes control logic 23 and is in communication with the plurality of wheel speed sensor ports 18a, 18b, 18c, 18d, 18e, 18f and the communication port 28. The processing unit 21 may comprise any type of technology. For example, the processing unit 21 may comprise a dedicated-purpose electronic processor. Other types of processors and processing unit technologies are possible.

The processing unit 21 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit 21. Other types of memories and technologies are possible.

The control logic 23 receives messages from the serial communication bus 20 via the communication port 28. The messages include tire characteristic messages as transmitted on the serial communication bus 20 from the wireless receiver 24. The control logic 23 also transmits messages to the serial communication bus 20 via the communication port 28. The transmitted messages include the tire characteristic messages with associated wheel location.

In alternative embodiment, the wireless receiver 24 is integrated with the controller 22 to provide a single, integrated tire sensor monitoring controller. In this arrangement, the control logic 23 of the controller 22 decodes the data in the tire characteristic signals directly from the antenna 26 rather than monitor the serial communication bus 20 for the separate tire characteristic messages.

The tire sensor system 11 optionally includes a display device 32. The display device may be connected with the controller 22 or to the serial communication bus 20. The display device 32 communicates the status of the tire sensor system 11 to a vehicle operator or technician. The display device 32 may be located on the dashboard of the vehicle 10. Optionally, the control logic 23 can record a fault and transmit a fault signal directly to the display device 32 or via the serial communication bus 20.

As stated previously, there is a need for an improved method to configure a tire sensor monitoring system for tractors and trucks so that each tire sensor is quickly and accurately assigned to the wheel location where it is installed. The method of configuring the tire sensor monitoring system disclosed herein does not require a separate download of sensor identification numbers to the controller 22 or additional tools such as sensor initiators. The disclosed method can also be used to identify tire sensor locations on other multi-wheeled vehicles, such as trailers.

In accordance with an aspect of the present disclosure, the control logic 23 comprises an auto-locating algorithm 200 that implements the disclosed method and an apparatus therefor. Notably, the processing unit 21 executes program instructions of the auto-locating algorithm 200 to predict position (i.e., the wheel location or position) of each one of the tire sensors 16a, 16b, 16c, 16d, 16e, 16f, 16g, 16h, 16i, 16j, as will be described in more detail hereinbelow.

For simplicity and purpose of explanation, only the clockwise rotating group of vehicle tires 12b, 12c, 12e, 12g, 12i and their associated tire sensors 16b, 16c, 16e, 16g, 16i will be described herein. The rotation direction of a tire may be obtained directly from the tire sensor data associated with that particular tire. Accordingly, no machine learning is required to establish rotation direction of a tire.

Figure 2:
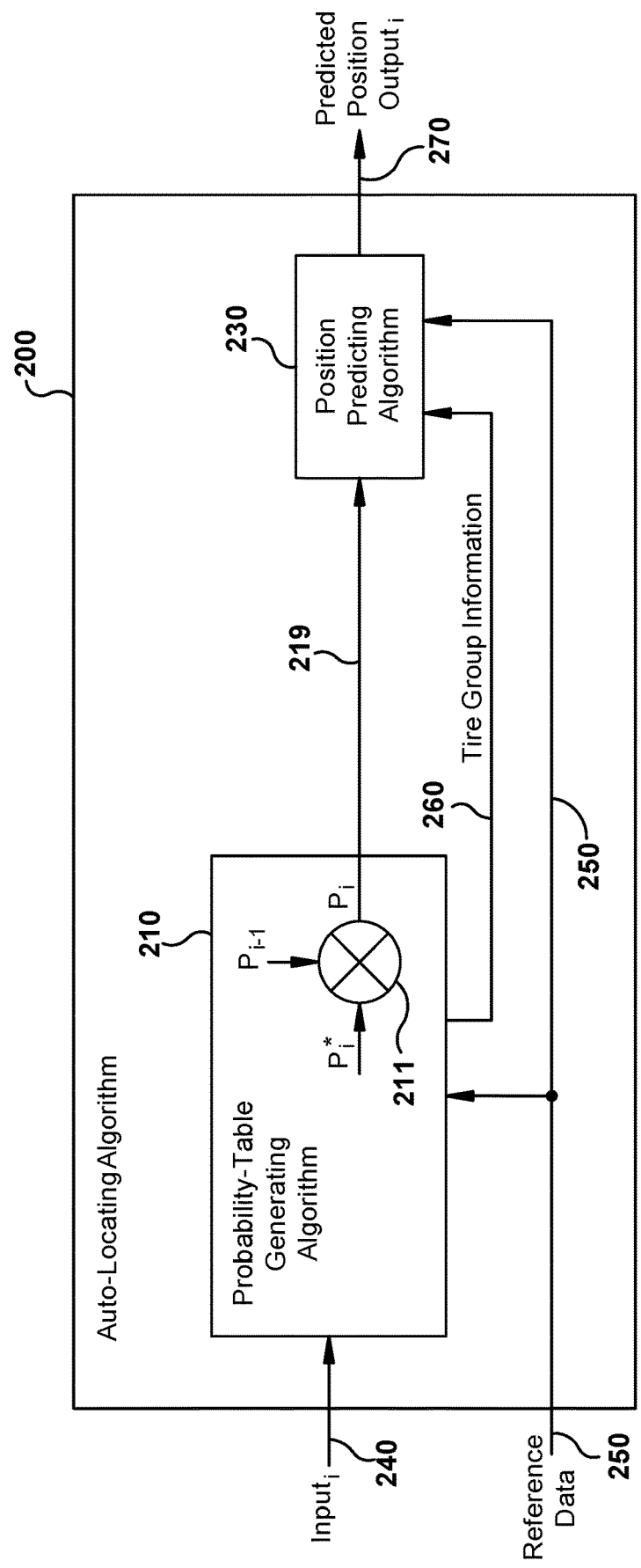
FIG. 2 is a block diagram of an auto-locating algorithm used in the tire sensor system of FIG. 1 according to an embodiment.

Referring to FIG. 2, a block diagram of the auto-locating algorithm 200 used in the tire sensor system 11 of FIG. 1 according to an embodiment is illustrated. The auto-locating algorithm 200 includes a probability-table generating algorithm 210 and a position predicting algorithm 230. The probability-table generating algorithm 210 processes Input 240 along with reference data 250 to provide output $P_i$ 219.

Input 240 is a data batch (i.e., a data batch i), and is tire sensor data in the form of an input table received from either the tire sensors 16a, 16d, 16f, 16h, 16j in the counter-clockwise rotating group of vehicle tires or the tire sensors 16b, 16c, 16e, 16g, 16i in the clockwise rotating group of vehicle tires. Reference data 250 represents data from serial communication and internal time stamps. Rotation direction of a tire is known within each associated tire sensor.

The position predicting algorithm 230 processes the $P_i$ 219 along with reference data 250 and tire group information 260 from the probability-table generating algorithm 210 to provide Output$_i$ 270. Tire group information 260 is associated with the one or more tire groups (e.g., the steer group, the inner group, and the outer group) to which each tire is a member of. Output$_i$ 270 is in the form of a predicted position (for each tire sensor) that is based upon a table containing probability values in which each probability value is indicative of likelihood of an associated tire sensor being located at a specific position (i.e., wheel location or position) on the vehicle 10.

Referring to FIG. 3A, a block diagram of the probability-table generating algorithm 210 used in the auto-locating algorithm 200 of FIG. 2 is illustrated. The probability-table generating algorithm 210 includes a feature 211 in which the output $P_i$ 219 varies as a function of a preliminary output $P_i^*$ that is modified by feedback of the previously-generated output $P_{i-1}$. The probability-table generating algorithm 210 may further include blocks 212, 213, 214, 215, 216, 217, which cooperate together as a neural network model for example, to provide the preliminary output $P_i^*$.

In FIG. 3A, $W_k$ represents trained weights, Bk represents trained biases, and/activation, k represents activation functions. The subscript "k" is the number of the neural network layer in the neural network model, as will be described in more detail in FIG. 3B.

Referring to FIG. 3B, a description of an example neural network 280 that can be used to implement the probability-table generating algorithm 210 of FIG. 3A is illustrated. The neural network 280 has an input layer (i.e., the first layer) with two inputs and ten neurons, a hidden layer (i.e., the second layer) with ten inputs and ten neurons, and an output layer (i.e., the third layer) with ten inputs and five neurons. Each of the first and second layers uses the "rectified linear unit (ReLU)" activation function, and the third layer uses "softmax" to give probabilities for different classes, as is known. The example neural network 280 may comprise a TensorFlow Keras application programming interface. TensorFlow is an end-to-end open source machine learning platform. Availability and application of machine learning platforms including neural network models are known and, therefore, will not be described.

Referring to FIG. 3C, an example probability table 290 that is generated using the probability-table generating algorithm 210 of FIG. 3A and the neural network 280 of FIG. 3B is illustrated. The probability table 290 comprises a 5×5 table that associates a corresponding probability value for each of the five tire sensors 16b, 16c, 16e, 16g, and 16i.

With reference to FIGS. 2, 3A, and 3C, it should be noted that the letter "i" (which is representative of the data batch associated with a probability value "P") is moved from the subscript position shown in FIGS. 2 and 3A to the superscript position shown in FIG. 3C. The subscript position in FIG. 3C is replaced with a first letter "k" that is representative of the particular sensor and a second letter "n" that is representative of the particular wheel position on the vehicle. This nomenclature will be used hereinafter to refer to probability values contained in the 5×5 probability table 290 shown in FIG. 3C.

Referring to FIG. 4, a description of an example set of equations 400 that are used for the feature 211 in the probability-table generating algorithm 210 in the auto-locating algorithm 200 of FIG. 2 is illustrated. The equations 400 transform probability values in the 5×5 probability table into a general pattern of probability values based upon the signals received from the five tire sensors 16b, 16c, 16e, 16g, 16i. It is conceivable that the probability-table generating algorithm 210 may employ additional equations, or alternatively, a different set of equations to obtain a general pattern of probability values.

Figure 5A:
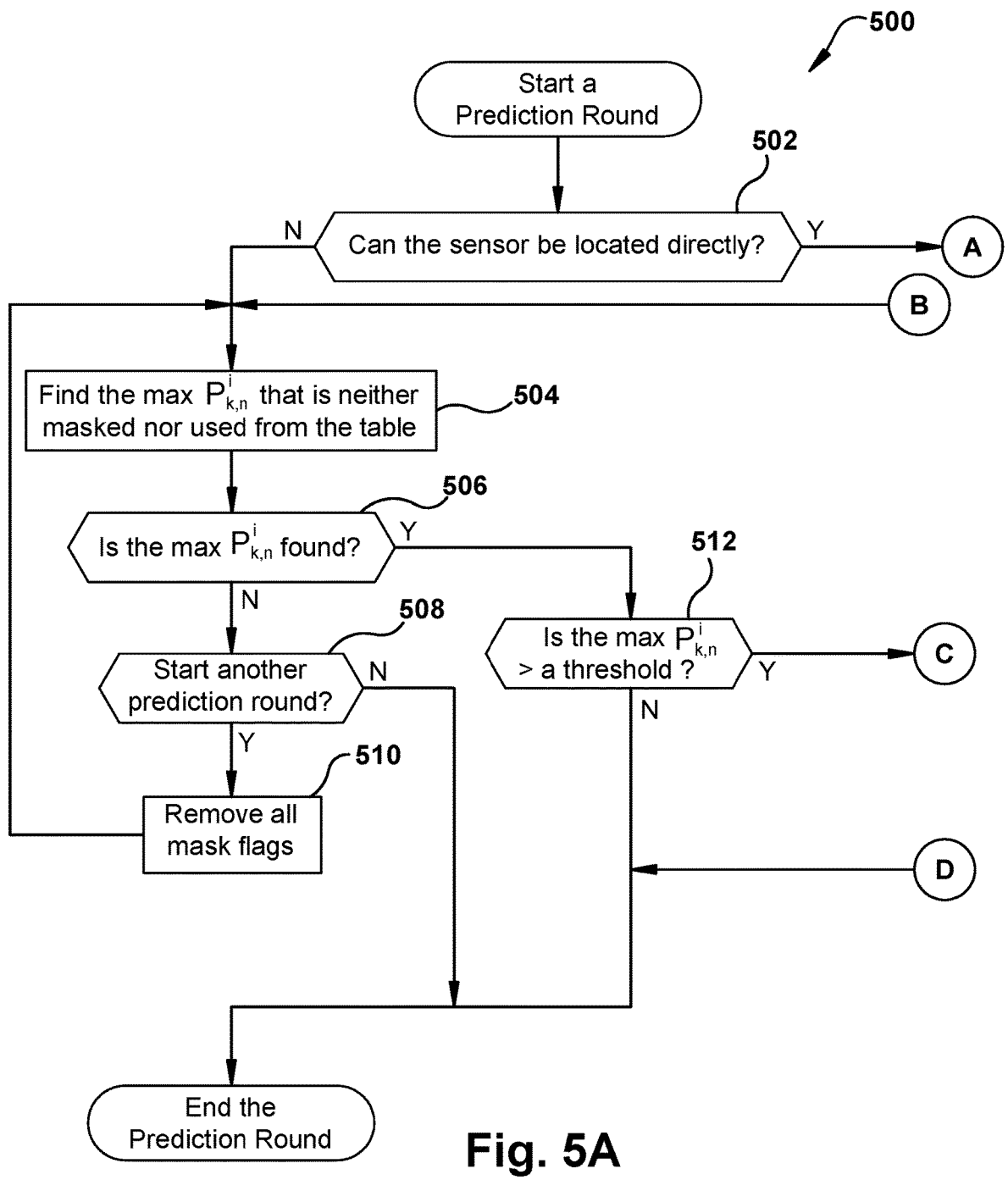
FIGS. 5A and 5B are a flow diagram depicting an example method for a position predicting algorithm according to an embodiment.
Figure 5B:
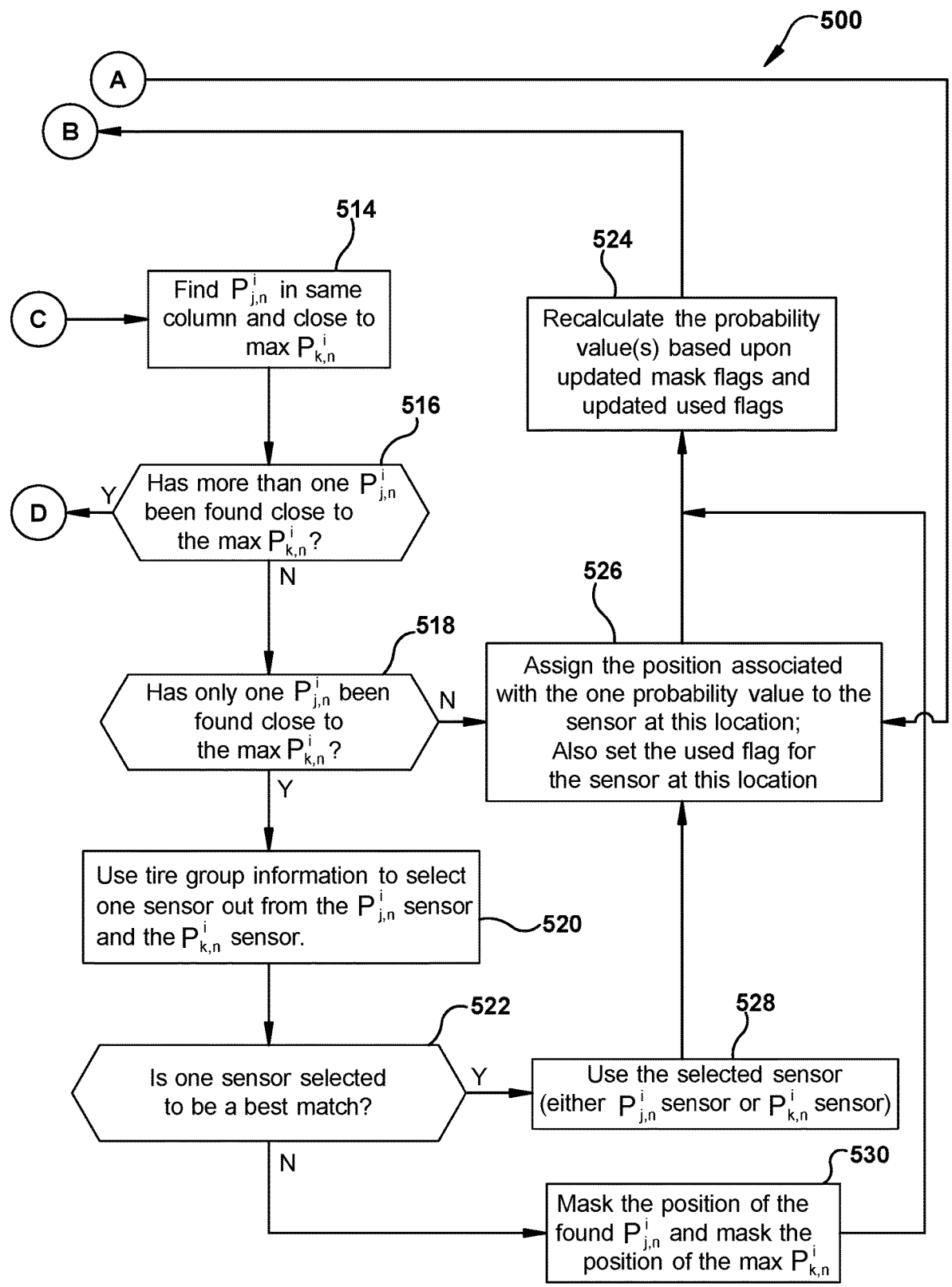

Referring to FIGS. 5A and 5B, a flow diagram 500 depicts an example method for the position predicting algorithm 230 according to an embodiment. The method of FIGS. 5A and 5B represents a prediction round and is applied to each one of the five tire sensors 16b, 16c, 16e, 16g, 16i. In block 502, a determination is made as to whether the position of the sensor can be located directly. If the determination in block 502 is negative (i.e., the position of the sensor cannot be located directly), the process proceeds to block 504. In block 504, the process attempts to find the maximum probability value (i.e., max $P^i_{k,n}$) that is associated with the particular sensor and that is neither masked nor used from the probability table (i.e., the "table").

A sensor is considered "masked" when two sensors are indicated in the table as being in the same position. As shown in FIG. 5C, when sensor "m" and sensor "n" are both at position "i", both sensor m and sensor n as well as position i are temporarily masked. When this occurs, the probabilities of sensor m and sensor n are not changed, and the other sensors at position i are temporarily assigned a value of "0". A "mask flag" is set to indicate the occurrence of this event. The masking event and the setting of the mask flag are shown in FIG. 5C with table 550 before the masking and table 552 after the masking.

A sensor is considered "used" when the sensor is predicted to be at a specific position. As shown in FIG. 5D, the sensor "k" is predicted to be at position "z". When this occurs, the probability of sensor k on position z is set to "1", the probabilities of sensor k on other positions are set to "0", and the probabilities of other sensors on position z are set to "0". A "used flag" is set to indicate the occurrence of this event. The using event and the setting of the used flag are shown in FIG. 5D with table 560 before the using and table 562 after the using.

The process then proceeds from block 504 to block 506 in which a determination is made as to whether the max $P^i_{k,n}$ is found. If the determination in block 506 is negative (i.e., max $P^i_{k,n}$ is not found), the process proceeds to block 508. In block 508, a determination is made as to whether another prediction round is to be started. Example criteria in determining whether another prediction round is to be started include when the number of masked sensors in the present prediction round is less than the number of masked sensors in the previous prediction round.

If the determination in block 508 is negative (i.e., another prediction round is not to be started), the process ends to end the prediction round. However, if the determination in block 508 is affirmative (i.e., another prediction round is to be started), the process proceeds to block 510 in which all mask flags are removed (i.e., reset), and the process returns back to block 504 to repeat the process in blocks 504, 506 to find the max $P^i_{k,n}$.

When the determination in block 506 is affirmative (i.e., the max $P^i_{k,n}$ is found), the process proceeds to block 512. A determination is made in block 512 as to whether the max $P^i_{k,n}$ is greater than a predetermined threshold value. An example predetermined threshold value is "0.5". If the determination is negative (i.e., the max $P^i_{k,n}$ is not greater than the predetermined threshold value), the process ends to end the prediction round. However, if the determination is in block 512 is affirmative (i.e., the max $P^i_{k,n}$ is greater than the predetermined threshold value), the process proceeds to block 514.

In block 514, the process attempts to find another probability value (i.e., $P^i_{j,n}$) that is in the same column and close to the max $P^i_{k,n}$. A determination is then made in block 516 as to whether more than one $P^i_{j,n}$ has been found close to the max $P^i_{k,n}$. If the determination in block 516 is affirmative (i.e., more than one $P^i_{j,n}$ has been found close to the max $P^i_{k,n}$), the process ends to end the prediction round. However, if the determination in block 516 is negative (i.e., no more than one $P^i_{j,n}$ has been found close to the max $P^i_{k,n}$), the process proceeds to block 518.

In block 518, a determination is made as to whether only one $P^i_{j,n}$ has been found close to the max $P^i_{k,n}$. If the determination in block 518 is negative (i.e., no $P^i_{j,n}$ has been found close to the max $P^i_{k,n}$), the process proceeds to block 526. In block 526, the position associated with the max $P^i_{k,n}$ probability value is assigned to the sensor at this location since no $P^i_{j,n}$ has been found close to max $P^i_{k,n}$. The used flag for the sensor at this location is set before proceeding to block 524. In block 524, the max $P^i_{k,n}$ probability value is recalculated based on updated mask flags and updated used flags. The process then returns back to block 504 to repeat the process in blocks 504, 506 to find the max $P^i_{k,n}$.

However, if the determination back in block 518 is affirmative (i.e., only one $P^i_{j,n}$ has been found close to the max $P^i_{k,n}$), the process proceeds to block 520 in which the tire group information of the $P^i_{j,n}$ sensor and the tire group information of the $P^i_{k,n}$ sensor are used to select one sensor out from the $P^i_{j,n}$ sensor and the $P^i_{k,n}$ sensor. A determination is then made in block 522 as to which sensor can be selected to be a best match based on tire group information. An example of selection criteria can be comparing the inner/outer group information of the $P^i_{j,n}$ sensor with the position to be assigned and the $P^i_{k,n}$ sensor with the position to be assigned.

If the determination in block 522 is affirmative (i.e., one tire group information best matches the position to be assigned and the other tire group information does not best match the position to be assigned), the process proceeds to block 528 in which the probability value associated with the sensor that best matches is selected for further processing. The process proceeds to block 526 in which the position associated with the selected probability value is assigned to the sensor at this location. The used flag for the sensor at this location is set before proceeding to block 524. In block 524, the selected probability value is recalculated based on updated mask flags and updated used flags. The process then returns back to block 504 to repeat the process in blocks 504, 506 to find the max $P^i_{k,n}$.

However, if the determination in block 522 is negative (i.e., the criteria of block 522 is not met), the process proceeds to block 530. In block 530, a mask flag is set for the sensor of the found $P^i_{j,n}$ and the sensor of the max $P^i_{k,n}$ at the position associated with max $P^i_{k,n}$ before proceeding to block 524. In block 524, both probability values are recalculated based upon updated mask flags and updated used flags. The process then returns back to block 504 to repeat the process in blocks 504, 506 to find the max $P^i_{k,n}$.

The blocks described hereinabove in FIGS. 5A and 5B are for when a sensor cannot be located directly as determined in block 502 (i.e., the sensor cannot be located directly). However, if the determination in block 502 is affirmative (i.e., the sensor can be located directly), the process proceeds to block 526. As an example, the sensor can be located directly when there is a probability value of "1" for only one position, and the probability values for the other four positions are "0". As another example, the sensor can be located directly when the sensor is fixed.

In block 526, the position associated with the probability value is assigned to the sensor at this location. The used flag for the sensor at this location is set before proceeding to block 524. In block 524, the probability value is recalculated based on updated mask flags and updated used flags. The process then proceeds to blocks 504, 506 to find the max $P^i_{k,n}$, as previously described.

Referring to FIG. 5E, an example series 570 of output probability tables produced according to the method of FIGS. 5A and 5B is illustrated. More specifically, probability table 571 shows the state of probability values of an original table (e.g., when wheels are rotated and/or tires and their associated tire sensors are installed or replaced). Table 572 shows the state of probability values after sensor 2 has been predicted to be at position 2. Then table 573 shows the state of probability values after sensor 1 has been predicted to be at position 1, table 574 shows the state of probability values after sensor 5 has been predicted to be at position 5, and table 575 shows the state of probability values after sensor 3 has been predicted to be at position 3. Table 576 shows the state of probability values after all of the sensors are allocated.

Figure 6:
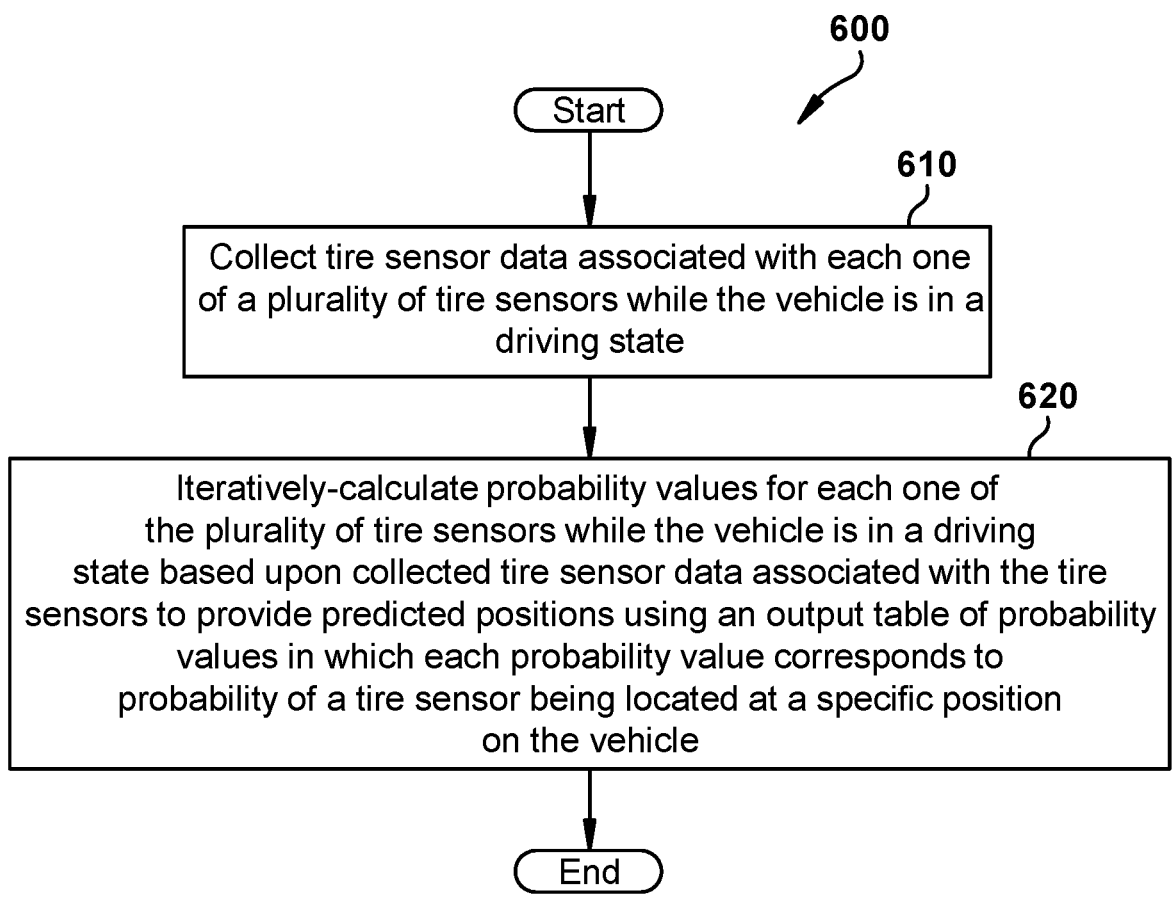
FIG. 6 is a flow diagram depicting an example method for a position predicting algorithm according to another embodiment.

Referring to FIG. 6, a flow diagram 600 depicts an example method for a position predicting algorithm according to another embodiment. In block 610, tire sensor data associated with each one of a plurality of tire sensors is collected while the vehicle is in a driving state. Then in block 620, probability values for each one of the plurality of tire sensors are iteratively-calculated while the vehicle is in a driving state based upon collected tire sensor data associated with the tire sensors to provide predicted positions using an output table of probability values in which each probability value corresponds to probability of a tire sensor being located at a specific position on the vehicle.

In some embodiments, the collected tire sensor data associated with each one of a plurality of tire sensors includes collected tire pressure data associated with each one of the plurality of tire sensors while the vehicle is in a driving state.

In some embodiments, the collected tire sensor data associated with each one of a plurality of tire sensors includes collected tire temperature data associated with each one of the plurality of tire sensors while the vehicle is in a driving state. The collected tire pressure data is adjusted to allow for temperature impact on probability values. For example, the tire pressure data may be adjusted based upon the pressure at a temperature of 18 degrees Celsius using the following equation that is based on Gay-Lussac's law:

$$Pressure_{adjusted}=(Pressure \times (273+18))/(273+Temperature)$$

In some embodiments, the collected tire sensor data associated with each one of a plurality of tire sensors includes collected received signal strength indication (RSSI) data associated with each one of the plurality of tire sensors while the vehicle is in a driving state.

It should be apparent that tire sensor signals are processed within the probability-table generating algorithm 210 using iteratively-based prediction techniques (e.g., neural network based prediction techniques) to provide an intermediate table of probability values. The intermediate table of probability values is processed within the generating algorithm 210 before the intermediate table of probability values is presented to the position predicting algorithm 230 to process the intermediate table of probability values to finalize a unique position to each sensor as shown in FIG. 5E. The position predicting algorithm 230 employs a combination of mask flags and used flags to facilitate making more accurate position predictions during prediction rounds.

It should also be apparent that a probability value is calculated for each one of the plurality of tire sensors based upon signals that have accumulated over a period of time to provide the output table of probability values. Each probability value contained in the table during a calculation cycle (i.e., prediction round) is indicative of likelihood of one of the plurality of tire sensors being located at a corresponding one of a plurality of positions on the vehicle. Each one of the plurality of tire sensors is associated with the position having the highest probability value during the calculation cycle. The probability values are iteratively-calculated, without any human intervention, based upon tire sensor data collected from the tire sensors 16b, 16c, 16e, 16g, 16i.

It should also be apparent that the vehicle driver may be provided with position status of each one of the plurality of tire sensors 16b, 16c, 16e, 16g, 16i on the vehicle while the vehicle is in a driving state. This information can be presented on the optional display device 32 (FIG. 1) which may be located on the vehicle dashboard. Moreover, the position status of each one of the plurality of tire sensors 16b, 16c, 16e, 16g, 16i may be communicated to other vehicle controllers via the serial communication bus 20, for example.

It should further be apparent that the auto-locating algorithm 200 and its components are integrated into a practical application of automatically, without any human intervention and without any external tools, locating the positions of a plurality of tire sensors on a vehicle while the vehicle is a driving state or a non-driving state. The result is labor cost savings as well as tool cost savings during regular maintenance service of the vehicle.

The auto-locating algorithm 200 finds particular application in conjunction with a heavy vehicle, such as a truck in which there are a large number of wheels and, therefore, a large number of tire sensor positons that need to be identified and located.

Although the above description describes the auto-locating algorithm 200 in which original probability tables are provided by a neural network model, it is conceivable that the original probability tables be provided by other iterative-based techniques. It is also conceivable that vehicle data other than tire sensor data be collected and accumulated.

Although the above description describes the auto-locating algorithm 200 being applied while the vehicle is in a driving state, it is conceivable that the auto-locating algorithm be applied while the vehicle is in a non-driving state. For example, the vehicle may be in a vehicle testing area off of public roads, which is a non-driving state.

Also, although the above description describes the auto-locating algorithm 200 initializing and terminating the process to provide predicted probability values in probability tables, it is conceivable that a human operator manually enter one or more initial positions of the plurality of tire sensors. The one or more initial positions are overwritten using positions determined by the probability values that have been calculated based upon the collected tire sensor data.

Further, although the above description describes the vehicle 10 including the components shown in FIG. 1, it is conceivable that vehicle 10 need not include all of the components shown to implement the auto-locating algorithm 200. For example, the wheel speed sensors 14a, 14b, 14c, 14d, 14e, 14f are not required to implement the auto-locating algorithm 200. Moreover, it is conceivable that another controller be used to implement the auto-locating algorithm 200 described herein. Any controller on the vehicle (e.g., brake, dash, etc.) may be used.

Also, although the above-description describes the auto-locating algorithm 200 being used in conjunction with a heavy vehicle such as a truck, it is conceivable that the auto-locating 200 may be used in other types of heavy vehicles, such as busses for example.

Further, although the above description describes the auto-locating algorithm 200 being used in conjunction with predicting positions of a plurality of wireless tire sensors on a vehicle, it is conceivable that an auto-locating algorithm be used in conjunction with other types of wireless sensors on a vehicle.

As an example, the wireless sensors may comprise a plurality of wireless wheel speed sensors. In this case, the signals from each one of the plurality of wireless wheel speed sensors includes a combination of (i) rotating wheel frequency data from the corresponding one of the plurality of wireless wheel speed sensors, (ii) rotating wheel direction data from the corresponding one of the plurality of wireless wheel speed sensors, and (iii) received signal strength indication (RSSI) data from the corresponding one of the plurality of wireless wheel speed sensors.

As another example, the wireless sensors may comprise a plurality of wireless brake pad wear sensors. In this case, the signals from each one of the plurality of wireless brake pad wear sensors includes a combination of (i) brake pad thickness data from the corresponding one of the plurality of wireless brake pad wear sensors, (ii) brake status data from the corresponding one of the plurality of wireless brake pad wear sensors, and (iii) received signal strength indication (RSSI) data from the corresponding one of the plurality of wireless brake pad wear sensors.

The above-described example methods may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An apparatus for auto-locating positions of a plurality of wireless sensors on a vehicle, the apparatus comprising:
  a receiving unit for receiving signals from the plurality of wireless sensors; and
  a processing unit arranged to calculate a probability value for each one of the plurality of wireless sensors based upon signals that have accumulated over a period of time to provide a table of probability values, wherein (i) each probability value contained in the table during a calculation cycle of the processing unit is indicative of likelihood of one of the plurality of wireless sensors being located at a corresponding one of a plurality of positions on the vehicle, and (ii) each one of the plurality of wireless sensors is associated with the position having the highest probability value during the calculation cycle.

2. The apparatus according to claim 1, wherein the signals from each one of the plurality of wireless sensors includes a combination of (i) rotating wheel frequency data from the corresponding one of the plurality of wireless sensors in the form of wireless wheel speed sensors, (ii) rotating wheel direction data from the corresponding one of the plurality of wireless wheel speed sensors, and (iii) received signal strength indication (RSSI) data from the corresponding one of the plurality of wireless wheel speed sensors.

3. The apparatus according to claim 1, wherein the signals from each one of the plurality of wireless sensors includes a combination of (i) brake pad thickness data from the corresponding one of the plurality of wireless sensors in the form of wireless brake pad wear sensors, (ii) brake status data from the corresponding one of the plurality of wireless brake pad wear sensors, and (iii) received signal strength indication (RSSI) data from the corresponding one of the plurality of wireless brake pad wear sensors.

4. An apparatus for auto-locating positions of a plurality of tire sensors on a vehicle, the apparatus comprising:
  a receiving unit for receiving signals from the plurality of tire sensors; and
  a processing unit arranged to calculate a probability value for each one of the plurality of tire sensors based upon signals that have accumulated over a period of time to provide a table of probability values, wherein (i) each probability value contained in the table during a calculation cycle of the processing unit is indicative of likelihood of one of the plurality of tire sensors being located at a corresponding one of a plurality of positions on the vehicle, and (ii) each one of the plurality of tire sensors is associated with the position having the highest probability value during the calculation cycle.

5. The apparatus according to claim 4, wherein the signals from each one of the plurality of tire sensors includes a combination of (i) tire pressure data from the corresponding one of the plurality of tire sensors, (ii) tire temperature data from the corresponding one of the plurality of tire sensors, and (iii) received signal strength indication (RSSI) data from the corresponding one of the plurality of tire sensors.

6. The apparatus according to claim 4, wherein a single, integrated tire sensor monitoring system controller comprises the receiving unit and the processing unit.

7. An apparatus for auto-locating positions of a plurality of tire sensors on a vehicle, the apparatus comprising:
  means for collecting tire sensor data from each one of the plurality of tire sensors; and
  means for predicting position of each one of the plurality of tire sensors based upon probability values that are calculated based upon the collected tire sensor data.

8. The apparatus according to claim 7, wherein the means for predicting position of each one of the plurality of tire sensors based upon probability values that are calculated based upon the collected tire sensor data includes:
   means for predicting position of each one of the plurality of tire sensors based upon probability values that are iteratively-calculated, without any human intervention, based upon the collected tire sensor data.

9. The apparatus according to claim 7, further comprising:
   means for enabling a human operator to manually enter one or more initial positions of the plurality of tire sensors, wherein the one or more initial positions are overwritten using positions determined by the probability values that have been calculated based upon the collected tire sensor data.

10. A tire sensor monitoring system controller for auto-locating positions of a plurality of tire sensors on a vehicle, the controller comprising:
   an input port for receiving a plurality of tire sensor signals;
   a processing unit for applying a position predicting algorithm to the tire sensor signals to predict positions of the plurality of tire sensors on the vehicle, wherein the processing unit provides an output table of probability values each probability value being indicative of probability of a tire sensor being located at a specific position while the vehicle is in a driving state; and
   an output port for communicating the predicted positions to other vehicle controllers.

11. The tire sensor monitoring system controller according to claim 10, wherein each probability value contained in the output table of probability values is iteratively-calculated within the position predicting algorithm.

12. The tire sensor monitoring system controller according to claim 10, wherein the tire sensor signals are processed within a probability-table generating algorithm using iteratively-based prediction techniques to provide an intermediate table of probability values.

13. The tire sensor monitoring system controller according to claim 12, wherein the probability-table generating algorithm uses neural network based prediction techniques to provide the intermediate table of probability values.

14. The tire pressure monitoring system controller according to claim 12, wherein the intermediate table of probability values is processed within a probability-table generating algorithm before the intermediate table of probability values is presented to the position predicting algorithm to process the intermediate table of probability values to provide the output table of probability values.

15. The tire sensor monitoring system controller according to claim 10, wherein the processing unit uses a combination of mask flags and used flags within the position predicting algorithm.

16. The tire sensor monitoring system controller according to claim 10, wherein the tire sensor signals include a combination of tire pressure data, tire temperature data, and received signal strength indication (RSSI) data accumulated over a period of time.

17. A method for a vehicle having a tire sensor system, the method comprising:
   collecting tire sensor data associated with each one of a plurality of tire sensors while the vehicle is in a driving state; and
   iteratively-calculating probability values for each one of the plurality of tire sensors while the vehicle is in a driving state based upon collected tire sensor data associated with the tire sensors to provide predicted positions using an output table of probability values in which each probability value corresponds to probability of a tire sensor being located at a specific position on the vehicle.

18. The method according to claim 17, wherein collecting tire sensor data associated with each one of a plurality of tire sensors includes:
   collecting tire pressure data associated with each one of the plurality of tire sensors while the vehicle is in a driving state.

19. The method according to claim 18, wherein collecting tire sensor data associated with each one of a plurality of tire sensors includes:
   collecting tire temperature data associated with each one of the plurality of tire sensors while the vehicle is in a driving state; and
   adjusting the collected tire pressure data based upon the collected tire temperature data.

20. The method according to claim 17, wherein collecting tire sensor data associated with each one of a plurality of tire sensors includes:
   collecting received signal strength indication (RSSI) data associated with each one of the plurality of tire sensors while the vehicle is in a driving state.

* * * * *